United States Patent [19]
Tilbor et al.

[11] Patent Number: 5,297,759
[45] Date of Patent: Mar. 29, 1994

[54] ROTARY AIRCRAFT PASSIVELY STABLE IN HOVER

[76] Inventors: Neil Tilbor, Six Taunton Rd., Medford, N.J. 08055; Herman M. Drees, 4056 Angela St., Simi Valley, Calif. 93063; William D. Watson, 1630 E. Wilton St.; Charles J. Sink, 1552 Patricia Ave., both of Simi Valley, Calif. 93065; Jeffrey Corsiglia, 6142 Via Escondido Dr., Malibu, Calif. 90265; Warren E. Bosch, 6000 Midlantic Dr., Mount Laurel, N.J. 08054

[21] Appl. No.: 863,998

[22] Filed: Apr. 6, 1992

[51] Int. Cl.$^5$ ............................................. B64C 27/00
[52] U.S. Cl. ........................... 244/17.11; 244/17.19; 244/17.21; 446/36; 446/37; 446/57
[58] Field of Search ............... 244/17.11, 17.19, 17.21, 244/17.23, 23 C, 12.2; 446/36, 37, 46, 57; 416/223 A, 228

[56] References Cited

U.S. PATENT DOCUMENTS

| | | | |
|---|---|---|---|
| 1,554,065 | 9/1925 | Blair | 446/37 |
| 1,632,179 | 6/1927 | Foerster | 446/37 |
| 1,697,009 | 1/1929 | Isacco | 244/17.11 |
| 2,638,707 | 5/1953 | Baker | 446/37 |
| 2,673,696 | 3/1954 | Pullin et al. | 244/17.11 |
| 2,816,764 | 12/1957 | Gleason | 446/36 |
| 2,917,255 | 12/1959 | Boyd | 244/17.11 X |
| 2,949,693 | 8/1960 | McRoskey | 446/37 |
| 3,010,678 | 11/1961 | Gose | 244/17.11 |
| 3,013,746 | 12/1961 | Siebenthal | 244/17.11 |
| 3,176,413 | 4/1965 | Dornier et al. | 244/17.11 X |
| 3,181,816 | 5/1965 | Pfeiderer | 244/17.17 |
| 3,394,906 | 7/1968 | Rogers | 446/37 X |
| 3,662,487 | 5/1972 | Seefluth | 446/37 |
| 3,881,729 | 5/1975 | Block et al. | 446/36 |
| 3,955,817 | 5/1976 | Davis | 273/106 D |
| 4,184,654 | 7/1980 | Herrera | 244/17.11 |
| 4,975,022 | 12/1990 | Perry | 416/228 |
| 5,030,157 | 7/1991 | Silverglate | 446/48 |

Primary Examiner—Margaret A. Focarino
Assistant Examiner—Christopher P. Ellis
Attorney, Agent, or Firm—Panitch Schwarze Jacobs & Nadel

[57] ABSTRACT

A rotary aircraft includes a cylindrically tubular hub mounting a plurality of outwardly extending, resiliently flexible blades. The blades are uniformly spaced around the hub and its central axis and fixed in pitch. Outer tips on each of the blades are downwardly turned and outwardly turned sufficiently to balance the lift generated by the blades from air striking the aircraft horizontally when the aircraft is in hover to provide passive stability to the aircraft. A pair of propellered electric motors are mounted on a diametrically opposing pair of the blades, pitched transversely to the central axis of the hub and to a plane perpendicular to the central axis, to simultaneously provide both lift and rotation. A battery supplies all power used by the aircraft while radio control circuitry in the hub permits variation of the power supplied to the motors for altitude control of the aircraft.

32 Claims, 3 Drawing Sheets

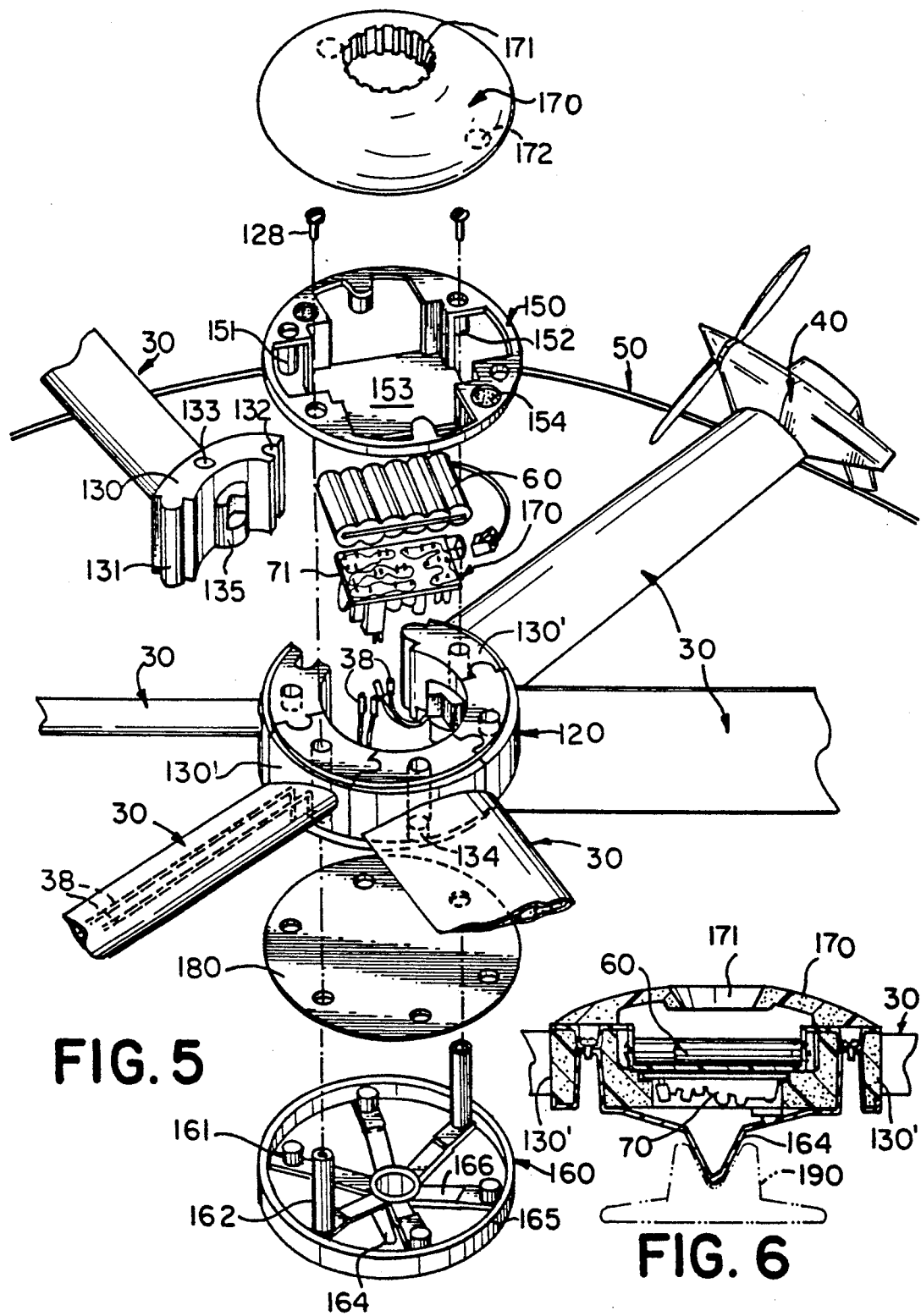

ROTARY AIRCRAFT PASSIVELY STABLE IN HOVER

BACKGROUND OF THE INVENTION

The term "rotary aircraft" is used to designate conventional rotary-wing aircraft such as helicopters having fuselages designed for independent non-rotational positioning with respect to a rotary wing and to aircraft lacking such fuselages.

It is well know to aeronautical engineers familiar with rotor design that a fixed-pitch rotor is inherently unstable in hover. A rotor comprising a hub with a plurality of blades, which are fixed in pitch with respect to the hub, will, when operated in hover (i.e. without horizontal movement), be disturbed by any incident wind perpendicular to the axis of rotation. The disturbance is characterized by the aerodynamic center of the rotor moving from the axis of rotation towards the source of the wind. The resulting aerodynamic imbalance causes the rotor to pitch. Because it is spinning, gyroscopic forces also cause the rotor to roll in a direction dependent upon the sense of rotor rotation. These combined forces act to cause the rotor to follow a circular flight path and this can cause the rotor to increase in pitch and roll in an uncontrolled manner.

In the past, means for stabilizing the spinning rotor of a helicopter or other rotary aircraft in hover have involved varying the pitch of individual rotor blades cyclically by a system controlled actively by a mechanical or electronic gyroscopic sensor. In hover, the blade pitch is varied cyclically so as to reduce lift at the rotor's upwind side to a value equal to that on the lee side and thus keep the resulting aerodynamic center of the rotor at the axis of rotation.

It would be desirable to provide a simple, low-cost means for stabilizing a fixed pitch rotor in hover.

It would further be desirable to provide a means for passively stabilizing a fixed pitch rotor in hover.

It further would be desirable to provide simple, inexpensive, rotary aircraft of minimal height, size, complexity and expense capitalizing upon such passive stability.

SUMMARY OF THE INVENTION

In one aspect, the invention is a rotary aircraft comprising: a hub having a central axis; and a plurality of blades extending generally outwardly from the hub. The blades are spaced generally uniformly around the hub. Each of the blades is essentially fixed in pitch with respect to the hub. Each of the blades is configured to generate lift generally in a lift direction parallel to the central axis when the blades and hub are rotated about the central axis in a given rotational direction. The aircraft further comprises means for rotating the hub and blades sufficiently quickly to generate a major proportion of the lift generated by the aircraft through the blades. At least enough blade outer tips are provided turned sufficiently transversely away from the lift direction and from a plane perpendicular to the lift direction and sufficiently radially outwardly away in the given rotational direction from tangents to radii from the central axis towards each tip to improve passive stability of the aircraft in hover in a cross-wind.

In another aspect, the invention is a rotary aircraft comprising: a hub having a central axis; a plurality of blades extending at least generally outwardly from the hub, spaced around the hub; and at least one propulsion device mounted to one of the plurality of blades. The propulsion device develops thrust transversely to the central axis and to a plane of rotation perpendicular to the central axis. The thrust including a component parallel to the plane of rotation and defining a common rotational direction of the hub and blades around the central axis. The thrust further includes a component parallel to the central axis and defines a common lift direction of the aircraft along the central axis.

In another aspect, the invention is a method for passively stabilizing a rotary aircraft in hover, the aircraft including a hub having a central axis and a plurality of blades coupled with the hub spaced around the hub, each of the blades extending at least generally outwardly from the hub and being fixed in pitch with respect to the hub. The blades are configured to generate lift in a common lift direction of the central axis when the hub and blades are rotated together in a given rotational direction around the central axis. The method comprises the steps of: rotating the hub and blades sufficiently quickly so as to support the aircraft in hover with the blades generating at least a major proportion of the lift supporting the aircraft and generating sufficient lift along an outer periphery of the rotating blades directed transversely outwardly at acute angles to both the lift direction and a plane of rotation perpendicular to the lift direction to maintain a center of the lift generated by the aircraft along the central axis while hovering in a cross-wind.

In yet another aspect, the invention is a method for passively stabilizing a rotary aircraft in hover, the aircraft including a hub having a central axis and a plurality of blades coupled with the hub spaced around the hub, each of the blades extending at least generally outwardly from the hub and being fixed in pitch with respect to the hub. The blades are configured to generate lift in a common lift direction of the central axis when the hub and blades are rotated together in a given rotational direction around the central axis. The method comprises the steps of: turning enough blade outer tips sufficiently transversely away from a plane of rotation perpendicular to the central axis and from the common lift direction and sufficiently radially outwardly in the given rotational direction from tangents to radii from the central axis towards each turned tip, to generate with the turned outer tips lift forces transverse to the central axis tending to stabilize the aircraft in hover in a cross wind; and rotating the hub and blades sufficiently quickly so as to support the aircraft in hover with the blades generating at least a major proportion of the lift supporting the aircraft.

BRIEF DESCRIPTION OF THE DRAWINGS

The foregoing summary, as well as the following detailed description of preferred embodiment, will be better understood when read in conjunction with the appended drawings. For the purpose of illustrating the invention, there is shown in the drawings embodiments which are presently preferred. It should be understood, however, that the invention is not limited to the specific methods and instrumentalities disclosed. In the drawings:

FIG. 5 is a partial, exploded perspective view of a preferred construction of a toy rotary aircraft; and FIG. 6 is a broken-away elevation through the aircraft hub.

DETAILED DESCRIPTION OF THE PREFERRED EMBODIMENT

Figure 1:
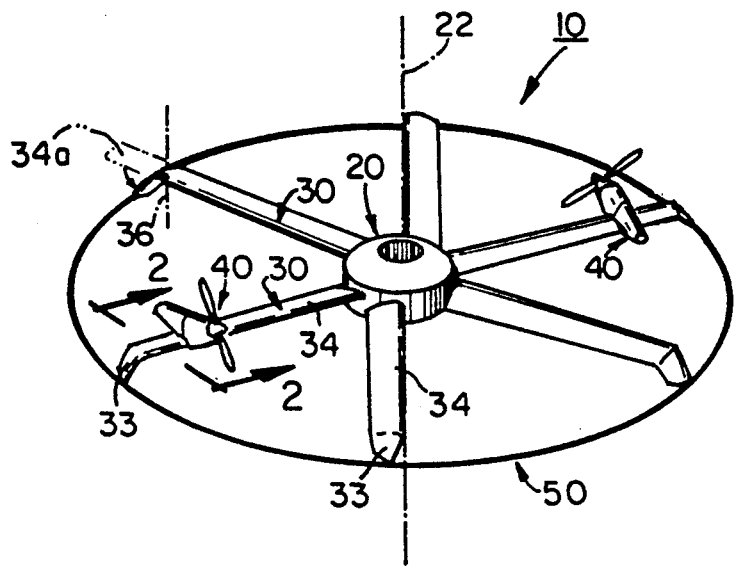
FIG. 1 is a perspective diagrammatic view of a rotary-wing aircraft of the present invention.

Certain terminology is used in the following description for convenience only and is not intended to be limiting. The words "right," "left," "lower" and "upper" designate directions in the drawings to which reference is being made. The words "inwardly" and "outwardly" and like terms refer to directions and locations toward and away from, respectively, the geometric center of the device and any designated part(s) thereof. Also, in the drawings, like numerals are used to indicate like elements throughout.

There is shown in the figures a preferred embodiment rotary aircraft of the present invention, indicated generally at 10, in the form of a generally planar, unmanned, radio controlled, flying disk. The aircraft 10 comprises a hub 20 having a central axis 22 and a plurality of preferably substantially identical blade assemblies 30 extending at least generally outwardly from the hub 20. The plurality of blade assemblies 30 of aircraft 10 are preferably substantially uniformly spaced around the hub 20 and central axis 22, sixty degree intervals for each of the six indicated blade assemblies 30. At least one and preferably a plurality of preferably identical propulsion devices, each indicated generally at 40, are further provided. Each propulsion device 40 preferably is mounted to and coupled with a separate, single blade assembly 30. Two or more propulsion devices 40 are preferably provided, depending upon the particular configuration of the aircraft, so that the propulsion devices 40 may be located symmetrically on the aircraft 10 in a manner to develop uniform torque around the central axis 22 and uniform lift in an upward direction along the central axis 22 and indicated by arrow 23 in FIG. 2. In an aircraft having an even number of blades, an even number of propulsion devices are preferably provided in diametrically opposed pairs. In an aircraft having an odd number of blades, an equal, odd number of identical propulsion devices preferably would be provided, one on each blade. However, a single one of the two propulsion devices 40 of sufficient power can rotate and lift aircraft 10 into the air.

Preferably, each propulsion device 40 comprises a prime mover 42 and a propeller 44 coupled with the prime mover 42 for rotation by the prime mover 42. More particularly, prime mover 42 may be an electric motor or gasoline engine with or without a transmission. Alternatively, a rocket motor, a jet engine or a source of high pressure gas (compressed or chemical reaction) might be employed as or as part of the propulsion device, either to drive a propeller through a coupled turbine or to provide thrust directly from the discharge of high velocity gases.

Figure 2:
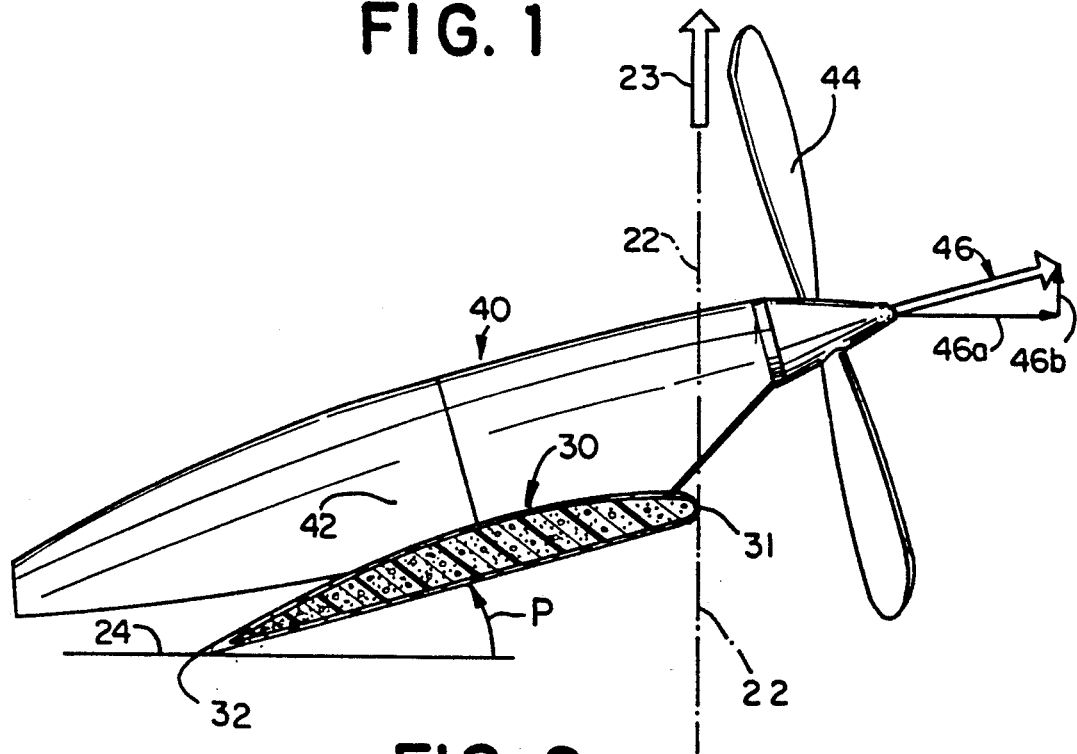
FIG. 2 is a section side elevation through one of the blades taken along the lines 2—2 of FIG. 1 showing one of the propulsion devices.

Referring to FIG. 2, a side elevation of one of the propulsion devices 40 looking towards the hub 20 and central axis 22, propeller 44 generates a thrust along its axis of rotation, the thrust being represented diagrammatically by arrow 46. Preferably, each propulsion device 40 develops thrust 46 having a component parallel to a plane of rotation, which is perpendicular to the central axis 22. This plane is parallel to the plane of FIG. 3 and horizontal in FIGS. 1 and 2. This thrust component is indicated at 46a in FIG. 2. The thrust components 46a of the various devices 40 point in and define a common rotational direction, which is counterclockwise in the various figures, around the central axis 22, for rotating the aircraft 10 in that direction. The rotational thrust component 46a is preferably developed tangentially with respect to a radius from the central axis 22 to the center of the propeller 44. In the figures, each leading edge is shown to lie along a radius from axis 22 for convenience of illustration. However, in a preferred embodiment, the leading edge 31 of each blade is positioned slightly in front of and parallel to a radius from the central axis 22 and hub 20. Of course, other orientations are possible.

The thrust 46 developed by each propulsion device 40 preferably also has a component 46b which is parallel to the central axis 22 and points in the upward, lift direction indicated by arrow 23, for augmenting lift provided by blade assemblies 30. By suitable design of the configuration of the aircraft and selection of the propulsion devices, this lift component can be made fairly significant. In the preferred embodiment 10 being described, the thrust of the propulsion devices 40 constitutes between about ten and twenty percent of the total lift developed by aircraft 10.

The major proportion of lift generated by aircraft 10 is preferably generated through blade assemblies 30. Preferably, each of the blade assemblies 30 is substantially identical. Each includes a blade 34 which is configured and oriented to generate lift in the upward "lift" direction 23 of central axis 22 when the hub 20 and blades 34 are rotated in the common rotational direction (counterclockwise in FIGS. 1 and 3).

Each blade 34 is preferably fixed in pitch with respect to the central axis 22 and hub 20 in that none of the blades 34 includes or is mounted to the hub with pivots, hinges or other rotatable, pivotable or movable components, as are employed in conventional helicopter rotor blades, to controllably vary pitch of the blades in operation. However, each blade 34 is preferably resiliently flexible to permit the blade to deform in response to varying aerodynamic and centrifugal loads.

Any of a variety of known chordal configurations may be employed in the blades. However, it has been found that even a blade 34 with a substantially planar chordal configuration and provided with a radiused leading edge 31 and an opposing trailing edge 32 which is tapered down from an upper side thereof, generates adequate lift for at least a toy aircraft 10, where each of the blades 34 is mounted to the hub 20 generally at a pitch angle between the vertical, which is represented in FIG. 2 by central axis 22, and a plane of rotation perpendicular to that axis 22, which is indicated by line 24 in FIG. 2. For example, for aircraft 10 the blades 34 are each suggestedly pitched upwardly at an angle between about twenty to thirty degrees from the perpendicular plane 24 at an angle which optimizes the lift-to-drag ratio of the blades. For aircraft 10 and blades 34, this is between about twenty-six to twenty-eight degrees. One of ordinary skill will appreciate that different configurations may yield different optimal pitch angles.

Figure 3:
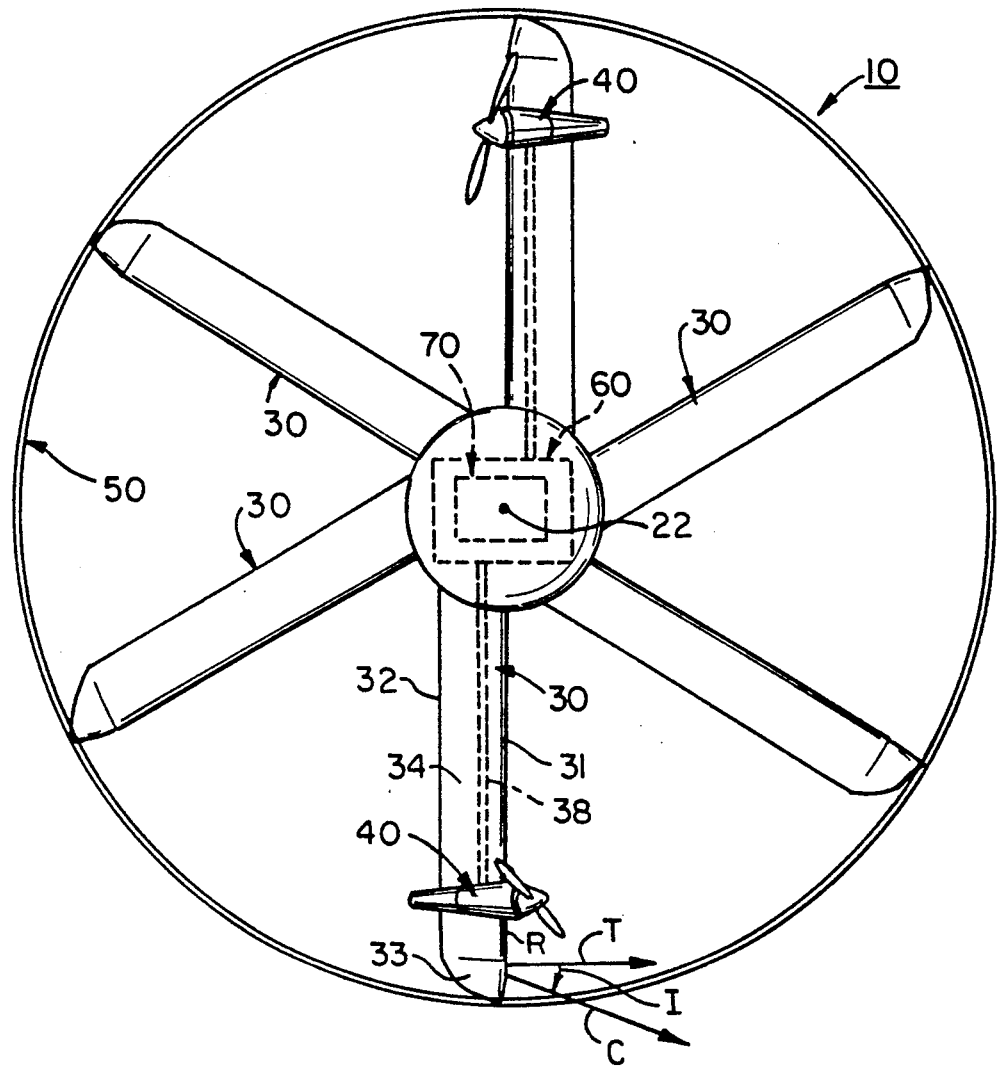
FIG. 3 is a plan view of the rotary-wing aircraft of FIGS. 1 and 2.

According to an important aspect of the invention, at least enough and preferably all of the blades 34 integrally supports an outer blade end or tip 33 which is turned sufficiently transversely away from a plane perpendicular to the lift direction 23, which plane is parallel to the plane of FIG. 3, and generally away from lift direction 23 and sufficiently radially outwardly away in the given rotational direction from a tangent to a radius from the central axis 22 towards the outer tip 33 to improve passive stability of the aircraft 10 and its hub 20 and blades 34 in hover.

Passive stability of the aircraft 10 is achieved by virtue of the configuration of the turned outer tips 33 which generate lift components which balance the overall aerodynamic lift generated by the aircraft, particularly where there is a relative movement between the aircraft 10 and the surrounding air in the plane of rotation of the blades.

When a hovering rotor formed by a hub with straight, fixed-pitch blades is struck by a cross wind (perpendicular to its axis of rotation), the aerodynamic center of the rotor moves upwind towards the direction of the gust. The resulting aerodynamic imbalance will cause the rotor to pitch. Because it is spinning, gyroscopic forces also force the rotor to roll in a direction dependent upon the sense of rotor rotation. These two forces act to cause the rotor to follow a circular flight path and can cause the rotor to continue to increase in pitch and roll in an uncontrolled manner. As was earlier mentioned, helicopters typically utilize cyclic blade pitch adjustments to prevent this interaction by reducing the lift on the rotor's upwind side to balance it with lift being generated on the rotor's lee side to keep the resultant aerodynamic center on the axis of rotation.

It has been found that downwardly and outwardly turning enough of the blade tips sufficiently will generate transverse lift forces which will counteract the imbalance of vertical lift forces being generated by the remainder of the blades to maintain the center of lift on the central axis of the rotor. The lift generated by each turned tip 33 is normal to the tip outer or upper surface. It is believed that as a downwardly turned blade tip of a rotor in hover experiences a relative horizontal movement of air, the vertical component of lift generated by the blade tips on the upwind side of the rotor is reduced while the vertical component of lift generated by the downwardly turned edges on the lee side of the rotor increase, thereby providing the counterbalancing forces.

Assuming chordal geometries remain relatively unchanged, four parameters substantially define the geometry of the rotor tip. These are turn-down angle, incidence angle relative to the rotor tangent, taper and sweep. Turn-down angle and incidence angle were found to most greatly influence rotor stability. Taper was found to be capable of diminishing the stabilizing effect while sweep was found to have little, if any, effect.

It has been found with the device 10 that a turn-down angle of the outer tips 33 away from the lift direction 23 and the plane of rotation perpendicular to the lift direction and towards a downwardly directed perpendicular 36 from the blade 34 to about midway between a projection 34a of the blade 34 and the perpendicular 36, i.e., an angle of about forty-five degrees to central axis 22, provided maximum stability. At this turn-down angle, the vertical lift component of each turned edge is equal to its horizontal lift component. Reducing or increasing the turn-down angle reduced the stabilizing effect of the tips. However, tips turn down by as little as about thirty degrees or as much as about sixty degrees still provided noticeable and adequate, though at times marginal, stability.

The angle of incidence is the angle formed by a chord center line "C" of the tip 33 with respect to a tangent "T" to a radius "R" extended from the central axis towards the tip. Both the tangent T and the chord C are extended in the given rotational direction of the aircraft to define the angle. When viewed in this way, the desired configuration is for each of the turned blade tips 33 to extend generally radially outwardly away from the tangent T at an incidence angle "I" of about twenty to thirty degrees and optimally between about twenty-six and twenty-eight degrees. Lower angles were found to proportionately reduce lift generated by the turned tips while higher angles quickly induced stall. For the indicated optimal blade pitch angle, a fold line angle of about ninety degrees with respect to the radial center line of the blade was found to provide the optimal tip angle of incidence. Lower fold angles resulted in higher tip incidence angles, which tended to induce tip stalls, while higher fold line angles resulted in reduced tip incidence angles, turning the cord line of the tips closer to the tangent and significantly reducing lift and stability.

Tip taper was found to have some effect on both stability and performance. A non-tapered, square tip was found to provide relatively good rotor stability and a bench mark for rotor performance, as measured by flight duration on a charged battery pack. Radiusing such a tip was found to have negligible effect on both stability and performance. Highly tapered tips, reduced downwardly to points, were found to provide little to no rotor stability. Reducing chordal length (leading to trailing edge dimension) of the tip 33 by no more than about fifty percent over the longitudinal length of the tip 33 was found to substantially maintain stability when compared with the square tip and to noticeably improve performance.

It was found that tip sweep had little or no effect on stability while some rearward sweep was found to have some slight beneficial effect on performance.

In addition to the foregoing, some balance must be maintained between the stabilizing lift forces generated by the turned outer tips 33 and the magnitude of the lift forces generated by the blades 34 in the lift direction 23. If insufficient horizontal lift forces are generated by the tips 33, stability is not improved. On the other hand, it has been found possible to generate excessive horizontal lift forces from the tips compared to overall vertical lift which, if present, overcompensate and induce a different instability phenomenon in the rotor. With the blade and tip geometries and configurations being used in the aircraft 10, it was found that angling between about twenty and thirty-five percent of the combined area of each blade and tip downwardly at the outer tip, provided improvement. In a currently preferred embodiment, the outer tips 33 are turned down at about twenty-three percent of the rotor radius (plan radius of FIG. 3 between central axis 22 and ring 50) measured in from the outer edge of the rotor radius.

Preferably too, a resiliently flexible peripheral ring 50 may be provided coupled with an extreme outer end of at least one, desirably two and preferably each turned outer tip 33. Ring 50, if provided, serves several functions including a means to support and distribute among the blade assemblies 30 the centrifugal and aerodynamic loads generated by the blades 34 and their turned tips 33 and to prevent objects from entering the device 10 laterally between the blade assemblies 30.

Figure 4:
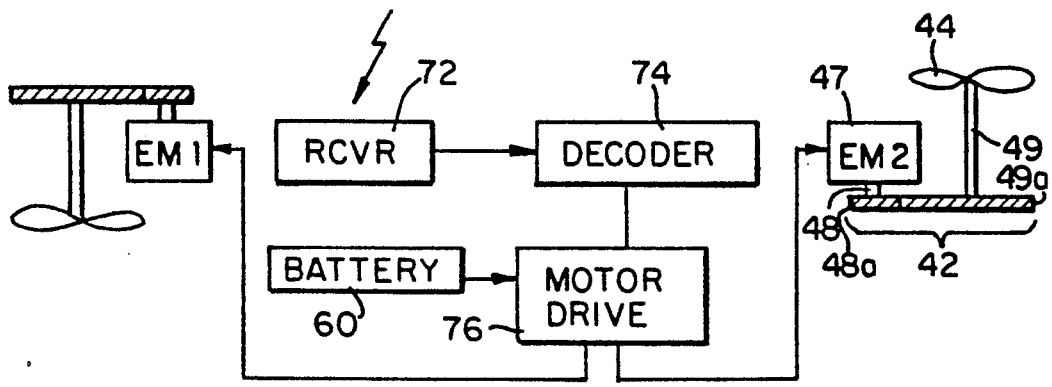
FIG. 4 is a block diagram of the power and control components of the rotary aircraft of FIGS. 1 through 3.

Preferably, rotary aircraft 10 is configured as a self-propelled, remotely controlled toy disk. Referring to FIG. 4, each prime mover 42 preferably comprises a small, relatively powerful electric motor 47 ("EM1" AND "EM2"), such as a Mabuchi Model RK-370 12.6-volt motor, having output shaft 48 mounting a pinion 48a driving a larger, reduction pinion 49a coupled to a parallel propeller shaft 49 coupled directly with the propeller 44. Wire pairs 38 are preferably passed from the hub 20 through channels in each wing 30 supporting a motor 47 to power the motor.

Preferably, the aircraft 10 is configured for free (untethered) flight, at least partially controlled by radio or other wireless signal transmission system. In this configuration, the aircraft 10 preferably includes an energy reservoir 60, such as a conventional rechargeable battery or pack of several batteries, which is supported by and preferably in hub 20. Reservoir/battery 60 supplies all power requirements of the aircraft 10 including those of propulsion devices 40. The aircraft 10 further preferably comprises a controller, preferably in the form of control circuitry, indicated generally at 70, which is provided for remotely controlling the aircraft 10, to the extend it can be controlled, by controlling the amount of electricity supplied to the propulsion devices 40 from battery/reservoir 60. Varying the electric power supplied from the battery/reservoir 60 to the electric motors 47 of the propulsion devices 40 permits altitude control of the aircraft 10.

Any of a variety of known control systems may be implemented in the aircraft 10. The simplest system involves merely switching on and off a fixed voltage/amperage current generated by the reservoir 60. More elaborate systems may be employed. For example, variable electric power may be supplied to the propulsion devices 40 and variable speed achieved by varying the voltage or amperage of the direct current supplied from battery/reservoir 60 to the electric motors 47 or by varying a defined duty cycle of a constant voltage/amperage current supplied to the motors. Also, the system can be configured to individually vary power supplied to the motors for performing stunts, if desired.

Preferably, the controller 70 includes a receiver 72 which detects control signals generated and transmitted in a conventional fashion by a portable ground control transmitter (not depicted), an optional decoder 74 for decoding control signals detected by the receiver 72, if decoding is necessary for the control scheme employed, and a motor driver 76 responsive to output from the decoding circuit 74, or directly from the radio receiver if the decoder is omitted, for varying the electric power supplied from the battery/reservoir 60 to each propulsion device 40. Motor driver 74 may be as simple as an on-off power transistor or a more complicated circuit varying amperage, voltage or a duty cycle. Referring to FIG. 5, some or all of these elements and circuits may be integrated together into a single circuit mounted on a single PC board 71.

It is preferred that the toy aircraft 10 be constructed of lightweight, resiliently flexible materials including, but not limited to, solid and/or foamed plastics, balsa and/or other lightweight woods, honeycombed or porous metal, Kevlar TM, fiberglass or other composite materials. Injection-molded polymer foam is currently preferred for the hub and blades due to its low cost, light weight, strength and flexible resilience. Aluminum is preferred for ring 50.

FIG. 5 depicts a presently preferred overall construction of aircraft 10. Preferably, each blade assembly 30 is injected molded integrally and monolithically with a partial tubular section, indicated generally at 130. The partial tubular section 130 may be configured by the provision of suitable structures 131 and 132 at its opposing circumferential ends to mate with structures 132 and 131 of the tubular sections of adjoining blades so as to form an integral tubular body of hub 20, indicated generally at 120.

The partial tubular sections 130 may be held together in any of a variety of ways including direct coupling between adjoining sections and encircling of the sections with a circular retainer. Preferably, the tubular sections 130 may be provided with bores 133 and 134 into their opposing upper and lower longitudinal sides, each of which receives a post 151 or a longer hollow tube 152 supported on a generally annular top frame member 150 or a post 161 or longer hollow tube 162 provided on a base 160. Bores in the tubular sections 130', which also support propulsion devices 40, preferably extend entirely through those sections to coaxially receive tubes 152 and 162 in facing contact with one another, as is best seen in FIG. 6. Facing tubes 152 and 162 can be joined together by screws 128 or other suitable means, locking all of the tubular o sections 130/130' together. Tubes 152, 162 not only permit fixed coupling of frame member 150 with base 160, they provide increased strength to withstand the tangential thrust forces generated by the propulsion devices 40. Each tubular section 130 may further be provided with an inwardly extended structure defining a first horizontal surface 135 for receiving and supporting the printed circuit board 71 and the lower side of bottom wall 153 of member 150. Member 150, in turn, receives and supports the battery pack/reservoir 60 on wall 153. Controller 70 is shown between battery pack/reservoir 60 and the ends of wire pairs 38 to illustrate the electrical connections therebetween. A removable cover 170 with a central finger opening 171 is preferably provided on the upper side of the hub body 120. Releasable means such as a fabric hook or loop fastener dot 172 adhering with a complementary fabric fastener dot 154 on the top of frame 150 can be provided for easy attachment and removal of cover 170. Preferably hub base 160 includes a downwardly taping cone 164 supported at the center of a ring 165 by a plurality of individual, radial support members 166, each of which also supports one of the posts 161 or tubes 162. Cone 164 can be placed into a complimentarily conically recessed stand 190, indicated diagrammatically in phantom in FIG. 6, which can be used to support the aircraft 10 before and during takeoff. If desired, a dust cover disk 180 can be provided between the base 160 and the bottom side of the partial tubular sections 130/130' to protect the otherwise open lower side of the hub tubular body 120 from contaminants.

One of ordinary skill in the art will appreciate that one or more small, model aircraft gasoline engines might be substituted for the electric motors disclosed. Moreover, the location of an energy reservoir in the form of a fuel tank in the hub 20 would foster the feeding of fuel to the engine by virtue of the centrifugal forces developed. However, it will also be appreciated that one or more appropriate, electromechanical servo-mechanisms would be needed to control fuel flow to the motors in order to vary their output. A similar control system might be used where high pressure gas (bottled or generated by chemical reaction) is employed as the propulsion device power supply.

In addition to a battery source of electrical energy, the aircraft 10 might include solar cells on portions or all of its upper surfaces to augment the power supplied by battery/reservoir 60. It is further conceivable that some or all of the aircraft 10 might be formed from a chargeable plastic material which functions as an electrical energy reservoir.

One of ordinary skill should appreciate that the provision of passive stability to a rotor assembly which includes a hub and a plurality of fixed pitch, flexibly resilient blades joined to the hub, can be used in conventional helicopter and other rotary aircraft construction and is not limited to the preferred toy embodiment 10 disclosed. It will also be appreciated that passive stabilization can be employed on rotors in which the propulsion units are mounted to the blades, as in aircraft 10, or in which the rotor is driven by means of one or more prime movers driving its hub.

Furthermore, one of ordinary skill will appreciate that transverse lift can be generated at the tips of some or all of the blades of a rotor, and with structures having configuration, geometries and parameters different from those employed in the described, presently preferred embodiment 10 for stabilization. Further, the turned blade outer tips may be displaced angularly with respect to the blades about the central axis, for example, along a ring coupling the essentially straight blades extending from the hubs with an identical or different number of turned outer blade tips to achieve the same result.

One of ordinary skill will appreciate that aircraft 10 could be coupled by wire to a ground controller providing current from a ground power source directly to the motors through slip ring couplings, for example, in the hub 10.

While preferred embodiments of the invention have been described and certain modifications thereto suggested, it will be recognized by those skilled in the art that other changes may be made to the above-described embodiments in the invention without departing from the broad, inventive concepts thereof. It should be understood, therefore, that the invention is not limited to the particular embodiments disclosed but covers any modifications which are within the scope and spirit of the invention as defined by the appended claims.

What is claimed is:

1. A rotary aircraft comprising:
   a hub having a central axis;
   a plurality of blades extending generally outwardly from the hub, the blades being spaced generally uniformly around the hub, each of the blades being essentially fixed in pitch with respect to the hub, the blades being configured to generate lift in a general lift direction parallel to the central axis when the blades and hub are rotated about the central axis in a given rotational direction in a plane of rotation perpendicular to the central axis;
   means for rotating the hub and blades sufficiently quickly to generate at least a major proportion of the lift generated by the aircraft through the blades; and
   at least a plurality of blade outer tips remote from the hub being turned sufficiently transversely away from the plane of rotation and away from the lift direction and sufficiently outwardly turned with respect to tangents to radii extending from the central axis towards each of the turned outer tips, to improve passive stability of the aircraft in hover in a cross-wind.

2. The rotary aircraft of claim 1 wherein each turned outer tip is turned transversely away about thirty degrees or more from the plane of rotation.

3. The rotary aircraft of claim 1 wherein each turned outer tip is turned away from the plane of rotation between about thirty degrees and sixty degrees.

4. The rotary aircraft of claim 1 wherein each turned outer tip is turned radially outwardly away from the tangent to the radius at an angle of at least about twenty degrees.

5. The rotary aircraft of claim 4 wherein each turned outer tip is turned radially outwardly away from the tangent to the radius at an angle of between about twenty-five and thirty degrees.

6. The rotary aircraft of claim 4 wherein each of the turned outer tips is turned transversely away from the plane of rotation and away from the lift direction to an angle about midway between the plane of rotation and to the central axis.

7. The rotary aircraft of claim 4 wherein each of the outer tips extends from a separate one of the blades and is turned identically downwardly and outwardly.

8. The rotary aircraft of claim 7 wherein each of the outer tips has a surface area at least about twenty percent of a total surface area of the tip and of the blade supporting the tip.

9. The rotary aircraft of claim 8 wherein the surface area of each of the turned outer tips is between about twenty percent and thirty-five percent of the total surface area of the blade and the outer tip.

10. The rotary aircraft of claim 1 wherein each of the turned outer tips has a surface area at least about twenty percent of a surface area of each blade.

11. The rotary aircraft of claim 10 wherein each turned outer tip is integral with one blade and the surface area of each of the turned outer tips is between about twenty and thirty-five percent of the total surface area of each blade and integral outer tip.

12. The rotary aircraft of claim 1 wherein the means for rotating comprises at least one propulsion device mounted to one of the blades at a location spaced radially outwardly from the hub.

13. The rotary aircraft of claim 12 further comprising a power supply in the hub coupled to at least the one propulsion device on the one blade.

14. The rotary aircraft of claim 13 wherein each propulsion device of the means for rotating comprises an electric motor and a propeller coupled with the motor for rotation and wherein the power supply comprises at least one electric battery in the hub powering at least one propulsion device electric motor.

15. The rotary aircraft of claim 14 further comprising a radio receiver on the aircraft and a controller on the aircraft responsive to the radio receiver to control electric current supplied from the at least one battery to the at least one electric motor.

16. The rotary aircraft of claim 1 wherein a curved tubular section is integrally fixed with each blade at one longitudinal end of the blade, wherein each tubular section is configured to mate with adjoining, like tubular sections and wherein each tubular section forms part of an integral tubular body of the hub.

17. The rotary aircraft of claim 16 wherein each blade and integrally fixed tubular section are molded together monolithically.

18. The rotary aircraft of claim 16 wherein the means for rotating comprises at least one propulsion device mounted to one of the blades at a location spaced radially outwardly from the hub and wherein the aircraft further comprises a controller within the hub coupled with the propulsion device and variably powering the propulsion device.

19. The rotary aircraft of claim 18 wherein the means for rotating comprises at least a second, substantially identical propulsion device coupled to a separate blade and with the controller in the hub, and wherein each of the blades of the aircraft has one of the turned outer tips.

20. The rotary aircraft of claim 19 wherein each outer tip is downwardly turned between about thirty and sixty degrees from a radially outward projection of the remainder of the blade, is outwardly turned between about twenty and thirty degrees with respect to the tangent from the radius, has a surface area of between about twenty and about thirty-five percent of the combined surface area of the outer tip and the blade and has a chordal length reducing no more than about fifty percent as the tip extends outwardly from the blade.

21. A rotary aircraft comprising:
a hub having a central axis;
a plurality of blades extending at least generally outwardly from the hub, the blades being spaced around the hub; and
at least one propulsion device mounted to one of the plurality of blades, the propulsion device developing thrust transversely to the central axis and to a plane of rotation perpendicular to the central axis, the thrust including a component parallel to the plane of rotation and defining a common rotational direction of the hub and blades around the central axis and further including a component parallel to the central axis and defining a common lift direction of the aircraft along the central axis.

22. The aircraft of claim 21 wherein the blades are configured to generate lift generally parallel to the common lift direction when the hub and blades are rotated in the common rotational direction about the central axis.

23. The aircraft of claim 22 comprising at least a second propulsion device mounted to a second one of the plurality of blades, the second propulsion device developing thrust having a component parallel to the plane of rotation and pointing in the common rotational direction and a component parallel to the central axis and pointed in the common lift direction, the first, second and any other propulsion devices mounted to the blades being angularly positioned around the central axis to uniformly develop thrust around the central axis.

24. The aircraft of claim 23 wherein each blade supports an outer tip turned generally transversely away from the common lift direction and from the blade, and each turned outer tip extending generally radially outwardly in the common rotational direction with respect to a tangent to a radius from the central axis towards the tip.

25. The aircraft of claim 24 wherein each blade is fixed in pitch with respect to the hub.

26. The aircraft of claim 25 wherein each blade is resiliently flexible.

27. The aircraft of claim 26 wherein each outer tip is turned away between about thirty and sixty degrees from the plane of rotation and generally away from the common lift direction.

28. The aircraft of claim 26 further comprising a ring encircling the plurality of blades, outer tips and the hub and coupling together at least two of the turned outer tips.

29. The aircraft of claim 21 configured as a flying disk having an overall size and external configuration at least substantially defined by the hub, the blades, outer tips and all propulsion devices of the aircraft.

30. The aircraft of claim 29 further comprising an energy reservoir in the hub and a controller in the hub configured to variably supply energy from the reservoir to the plurality of propulsion devices.

31. A method for passively stabilizing a rotary aircraft in hover, the aircraft including a hub having a central axis and a plurality of blades coupled with the hub spaced around the hub, each of the blades extending at least generally outwardly from the hub and being fixed in pitch with respect to the hubs, the blades being configured to generate lift in a common lift direction of the central axis when the hub and blades are rotated together in a given rotational direction around the central axis, the method comprising the steps of:
rotating the hub and blades sufficiently quickly so as to support the aircraft in hover with the blades generating at least a major proportion of the lift supporting the aircraft; and
generating sufficient lift along an outer periphery of the rotating blades directed transversely outwardly at acute angles to both the lift direction and a plane of rotation perpendicular to the direction to maintain a center of the lift generated by the aircraft along the central axis while hovering in a crosswind.

32. A method for passively stabilizing a rotary aircraft in hover, the rotor including a hub having a central axis and a plurality of blades coupled with the hub spaced around the hub, each of the blades extending at least generally outwardly from the hub and being fixed in pitch with respect to the hub, the blades being configured to generate lift in a common lift direction of the central axis when the hub and blades are rotated together in a given rotational direction around the central axis, the method comprising the steps of:
providing enough blade outer tips turned sufficiently transversely away from a plane of rotation perpendicular to the central axis and from the common lift direction and sufficiently turned with respect to tangents to radii from the central axis towards each turned tip to generate with the turned outer tips lift forces transverse to the central axis tending to stabilize the aircraft in hover in a cross wind; and
rotating the hub and blades sufficiently quickly so as to support the aircraft in hover with the blades generating at least a major proportion of the lift supporting the aircraft.

* * * * *